United States Patent [19]
Ninomiya et al.

[11] 4,210,939
[45] Jul. 1, 1980

[54] METHOD AND SYSTEM FOR SYNCHRONIZING THE MOVEMENT OF PLURAL RECORDING MEDIA

[75] Inventors: Ichiro Ninomiya, Atsugi; Katsuhiko Nagakura, Yokohama; Hitoshi Sakamoto, Zama; Katsuichi Tachi, Kawasaki, all of Japan

[73] Assignee: Sony Corporation, Tokyo, Japan

[21] Appl. No.: 916,052

[22] Filed: Jun. 16, 1978

Related U.S. Application Data

[63] Continuation-in-part of Ser. No. 843,314, Oct. 18, 1977, abandoned.

[30] Foreign Application Priority Data

Oct. 21, 1976 [JP] Japan .................................. 51-126658

[51] Int. Cl.² ............................................. G11B 15/52
[52] U.S. Cl. ........................................ 360/14; 360/72.2
[58] Field of Search .................... 360/14, 9, 10, 13, 15, 360/71, 72, 73; 318/85

[56] References Cited

U.S. PATENT DOCUMENTS

| | | | |
|---|---|---|---|
| 3,851,116 | 11/1974 | Cannon | 360/73 X |
| 3,911,488 | 10/1975 | Wood et al. | 360/71 |
| 4,066,349 | 1/1978 | Flint | 360/72 X |
| 4,067,049 | 1/1978 | Kelly et al. | 360/14 |
| 4,115,819 | 9/1978 | Shigeta | 360/14 |

FOREIGN PATENT DOCUMENTS 1179999  2/1970  United Kingdom ...................... 360/13

*Primary Examiner*—James W. Moffitt
*Assistant Examiner*—Donald McElheny, Jr.

*Attorney, Agent, or Firm*—Lewis H. Eslinger; Alvin Sinderbrand

[57] ABSTRACT

A method and system are provided for synchronizing the movement of a first recording medium by a first transport mechanism including a capstan with the movement of a second recording medium by a second transport mechanism also including a capstan, each of the first and second recording media having addressable recording frames identified by frame signals and addresses recorded thereon. The first and second recording media are rewound from respective predetermined addressable frames identified as $T_{AO}$ and $T_{BO}$, respectively. The first recording medium is advanced from its rewound position toward frame $T_{AO}$ at a fixed speed, e.g., a normal tape advance speed, in a capstan servo-locked condition, and the second recording medium is advanced from its rewound position toward frame $T_{BO}$ at a selective speed greater than, equal to or less than the fixed speed. Addresses $T_A$ and $T_B$ of the first and second recording media, respectively, are played back as the recording media are advanced. The address differential $T_A - T_B$ is compared with the fixed address differential $T_{AO} - T_{BO}$, or the address differential $T_A - T_{AO}$ is compared to the address differential $T_B - T_{BO}$, so as to advance the second recording medium at a speed corresponding to this comparison. When the respective address differentials are equal, that is, when $T_A - T_B = T_{AO} - T_{BO}$, or when $T_A - T_{AO} = T_B - T_{BO}$, the second recording medium is advanced at a servo-controlled fixed speed, provided that this address differential remains equal for a predetermined number of successive address playback operations.

15 Claims, 25 Drawing Figures

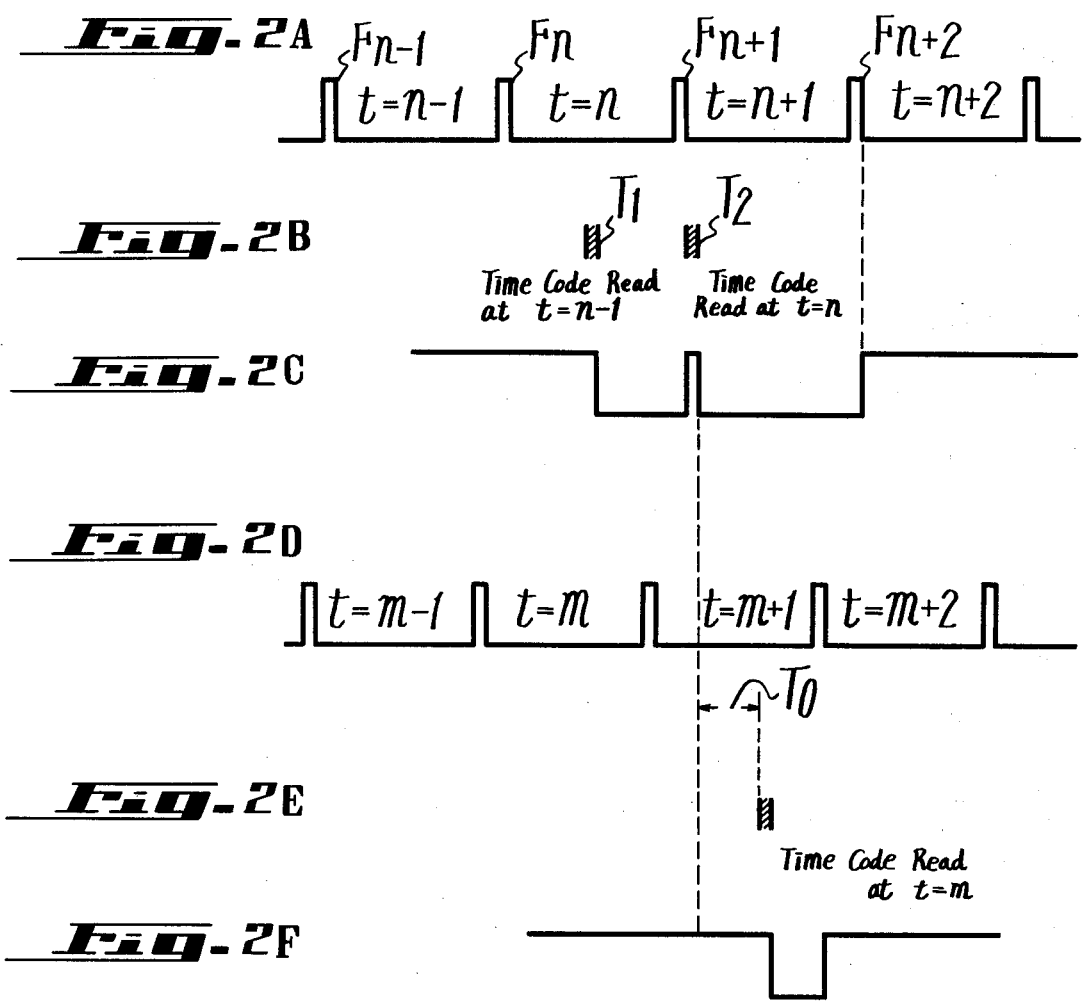

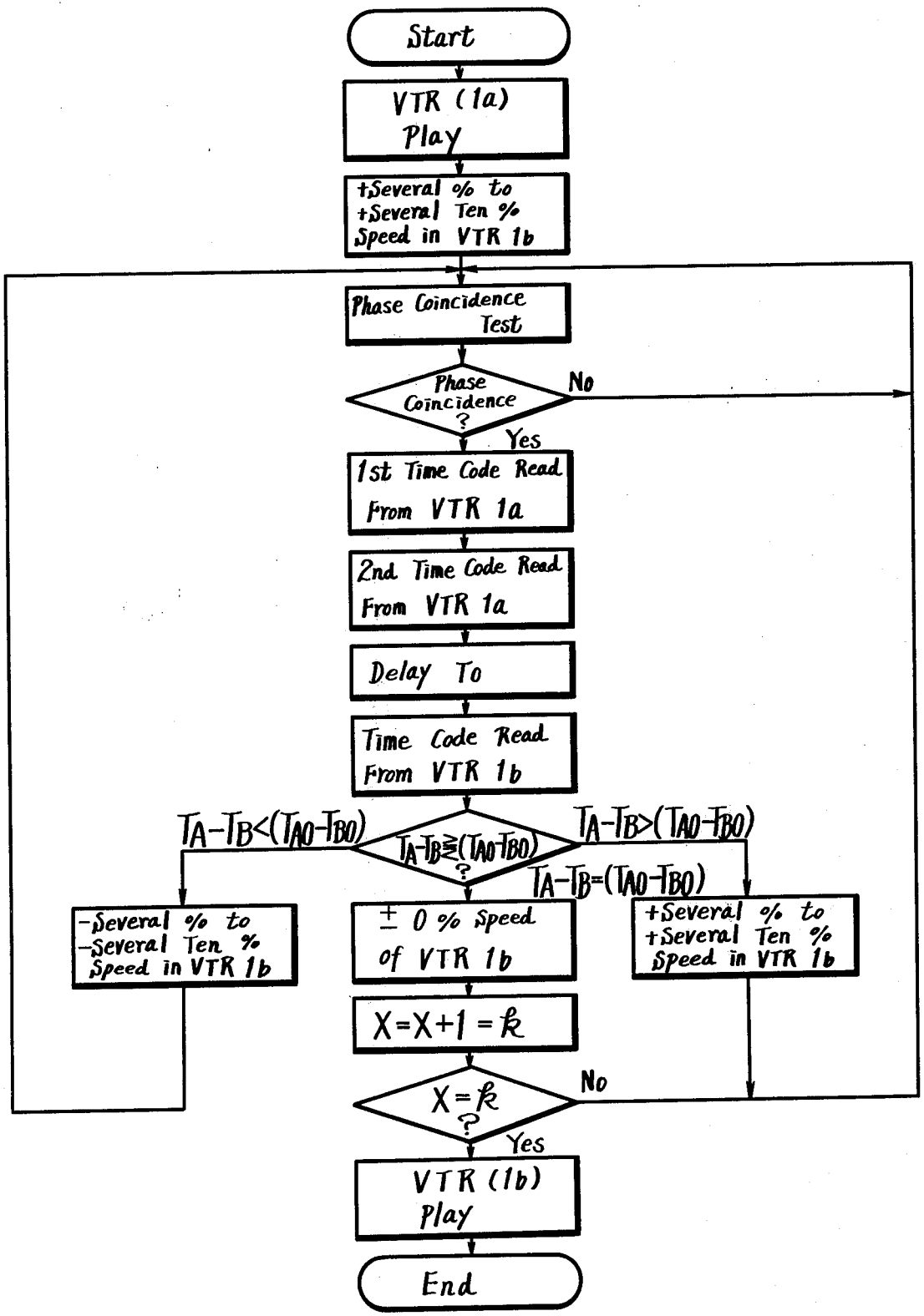

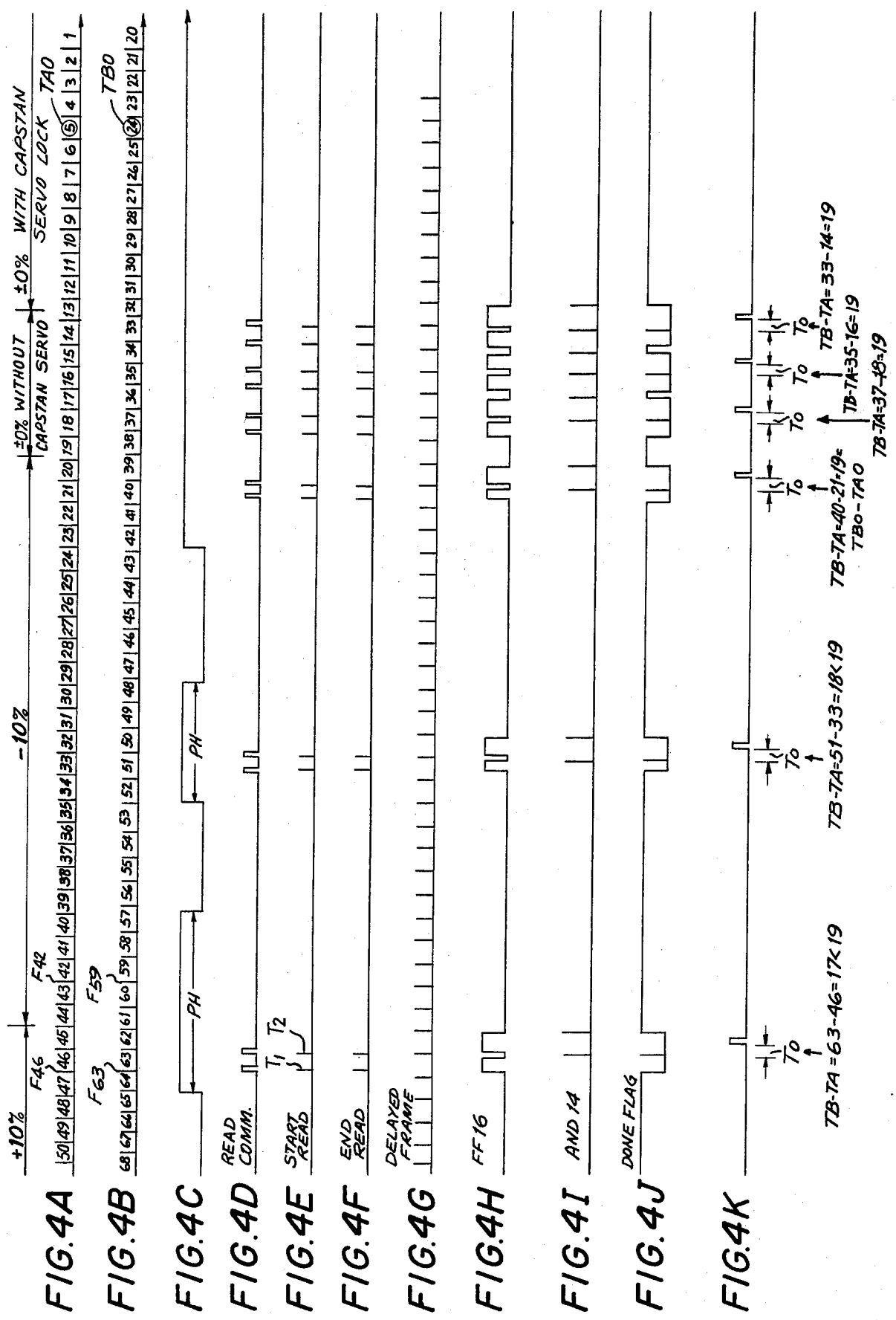

METHOD AND SYSTEM FOR SYNCHRONIZING THE MOVEMENT OF PLURAL RECORDING MEDIA

REFERENCE TO COPENDING APPLICATIONS

This is a Continuation-In-Part of copending application Ser. No. 843,314 filed Oct. 18, 1977, now abandoned.

BACKGROUND OF THE INVENTION

1. Field of the Invention

This invention relates to a method and system for synchronizing the movement of plural recording media and, more particularly, to such a method and system advantageously applicable to controlling the speeds of recording tape in video tape recorders so that information can be transferred therebetween at proper frames on the recording tapes.

2. Description of the Prior Art

The technique of synchronizing plural recording media, such as the recording tapes of two video tape recorders (VTR's) is known, as described in U.S. Pat. No. 3,911,488. According to this technique, an up/down counter is responsive to frame signals which are reproduced from the respective tapes. Frame signals which are reproduced from one tape increment the count of the counter, while frame signals which are reproduced from the other tape decrement the count. Initially, the counter is preset to some intermediate count, and this preset count either is increased or decreased depending upon whether the speed of one tape is greater or less than the speed of the other tape. A digital-to-analog converter is responsive to the instantaneous count of the counter and provides an analog rate control signal having an amplitude and polarity which simultaneously increases one tape speed while retarding the other. It is assumed that proper synchronism is attained when the counter resumes its intermediate count for a sufficient period of time, whereupon the rate control signals are disabled and a standard reference signal is used to control the speed of the tape.

The up/down counter which is used in this patent is preset to its intermediate count when a selected frame associated with one tape is reached. As this tape is further advanced, the count is increased. When the desired frame of the second tape is reached, the frame pulses which are reproduced from that second tape are supplied to the counter to reduce the count thereof. Further operation of the counter is dependent solely upon the frame signals, and there is no actual comparison between the instantaneous address reproduced from the first tape with the instantaneous address reproduced from the second tape. If this technique is used to control an editing operation between two VTR's, then it is necessary that the first tape be rewound from a selected frame by a certain amount, and that the second tape be rewound from its selected frame by at least that same amount. If one or the other tape is rewound by less than the required amount, then it is possible that those particular frames which are used to preset the counter and then to decrement the counter may never be reached. Consequently, a relatively long delay must be provided in order to assure that the tapes will be advanced in synchronism. The tapes cannot be rewound merely by an arbitrary amount; rather, it is necessary to rewind at least preset lengths of tape.

In U.S. Pat. No. 3,851,116, the speed of a single magnetic tape is controlled as a function of the distance between the actual position of the tape and a desired position therealong. The tape is divided into successive frames and the address of each frame is decoded and compared to a preselected address. The tape speed is variable according to the difference between the actual and predetermined addresses. However, this patent is limited solely to speed control over a single tape. There is, of course, no recognition of the problem of synchronizing two different tapes to run at precisely the same speed when selected addresses of the tapes are reached.

An analogous film speed control technique is described in U.S. Pat. No. 4,066,349 wherein a film strip is driven until a selected film frame is reached. Assuming that the actual frame being scanned differs from the desired frame, a ramp generator is enabled to produce a gradually increasing signal. This signal serves to increase the film speed. Once the film speed exceeds a predetermined level, a higher speed motor is energized to drive the film at a higher fixed speed. This advances the film beyond the desired frame, resulting in a reversed operation wherein the film then is driven in the opposite direction, first in response to the ramp signal and then in response to the high speed motor. This "hunting" about the desired frame continues until that frame ultimately is reached. Not only is this technique not suitable for driving two different film strips, or tapes, in synchronism, but the aforementioned hunting operation is time consuming and not very accurate.

OBJECTS OF THE INVENTION

Therefore, it is an object of the present invention to provide an improved technique which overcomes the aforenoted deficiencies of the above-mentioned prior art.

Another object of this invention is to provide an improved method and system for synchronizing the movement of plural recording media.

A further object of this invention is to provide a method and system for controlling the movement of first and second recording media so as to permit information which is recorded at one location of one medium to be transferred to a preselected location of the other medium.

An additional object of this invention is to provide a method and system which is advantageously used in an editing operation for video tape recorders.

Still another object of this invention is to provide a technique wherein two recording media, such as video tapes, are transported in speed and phase synchronism with each other at predetermined addressable locations, such as frames, starting from some arbitrary position of the media.

A still further object of this invention is to provide a method and system for driving one recording tape in synchronism with another recording tape by comparing the difference between the distance of one tape from its desired end location to the distance of the other tape from its desired end location, and for regulating the speed of one of such tapes in accordance with this difference.

Various other objects, advantages and features of the present invention will become readily apparent from the ensuing detailed description, and the novel features will be particularly pointed out in the appended claims.

SUMMARY OF THE INVENTION

In accordance with this invention, the movement of a first recording medium, such as a first recording tape transported by a first video tape recorder (VTR), is synchronized with the movement of a second recording medium, such as a second tape transported by a second VTR, each of the recording media having addressable recording frames identified by frame signals and addresses recorded thereon, such that both of the media, or tapes, are advanced by servo-controlled mechanisms to predetermined frames therealong. The first and second recording media are rewound from respective predetermined frames, and then are advanced toward such predetermined frames. The first recording medium is advanced at a fixed speed in capstan servo-lock relation while the second recording medium is advanced at a selective speed greater than, equal to or less than the fixed speed. The instantaneous addresses of the advancing recording media are played back, and address differentials are compared with each other so as to determine which medium is closer to its predetermined frame. If the first medium is closer, then the second medium is driven at the greater than fixed speed. If the second medium is closer, then it is driven at its less than fixed speed. If the two media are equidistant from their predetermined frames, then both are driven at the fixed speed. In accordance with a preferred embodiment, if both media remain equidistant from their predetermined frames for a selected number of frame intervals, than a servo loop is completed so as to control further movement of the second medium.

BRIEF DESCRIPTION OF THE DRAWINGS

The following detailed description, given by way of example, will best be understood in conjunction with the accompanying drawings in which:

FIGS. 2A–2F are timing diagrams which are helpful in understanding the operation of the system shown in FIG. 1;

FIG. 3 is a flow chart which is useful in explaining the operation of the system shown in FIG. 1;

FIGS. 4A–4K are additional timing waveforms which are useful in understanding the operation of the system shown in FIG. 1.

DETAILED DESCRIPTION OF THE PREFERRED EMBODIMENT

Figure 1:
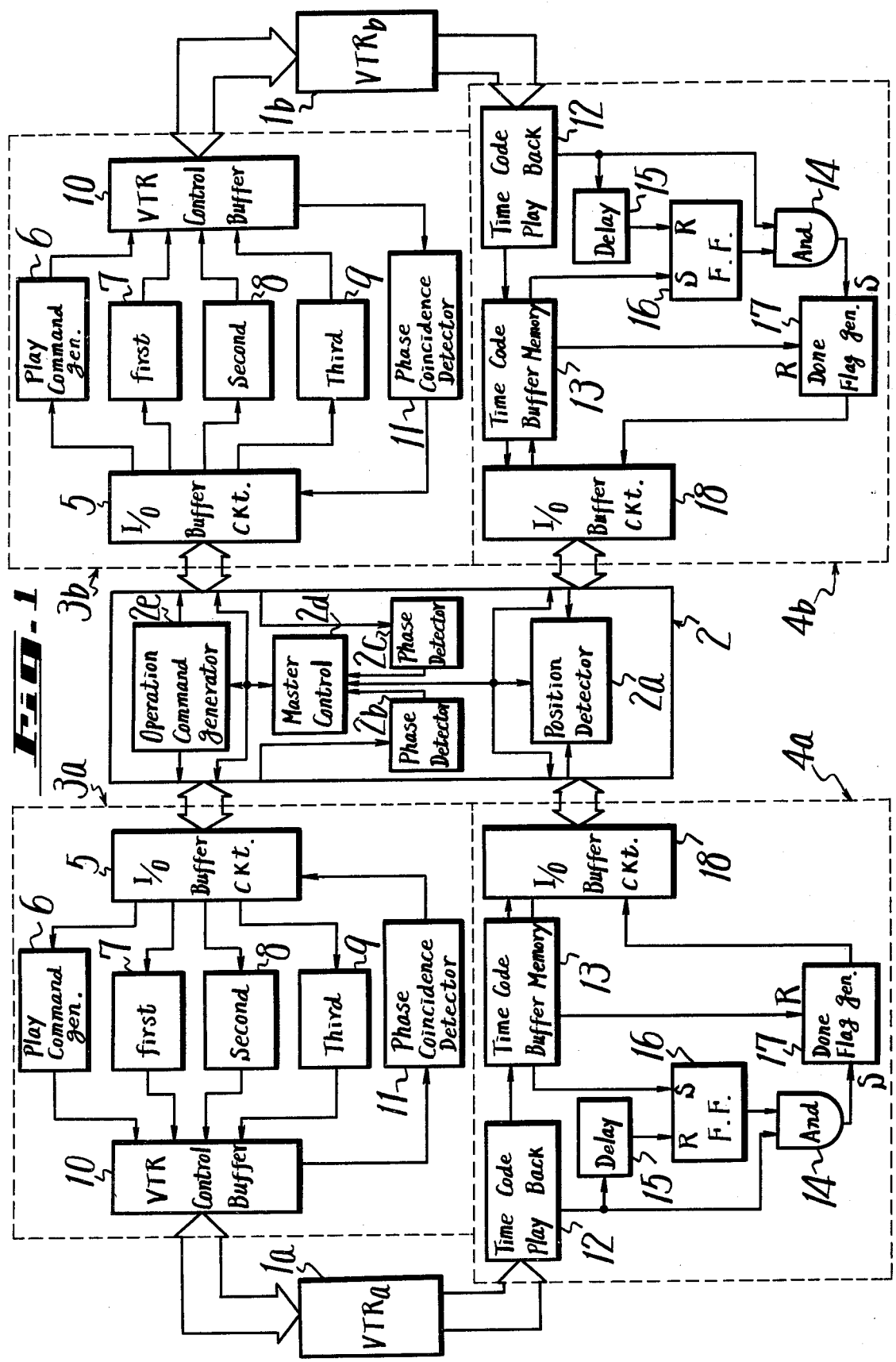
FIG. 1 is a block diagram showing one embodiment of the present invention in the environment of a system whereby two VTR's are controlled.

Referring now to the drawings, and in particular to FIG. 1, there is illustrated a block diagram of a preferred embodiment of the present invention. For the purpose of this description, it is assumed that only two recording media are to be driven in synchronism with each other. However, it will be appreciated that the principles of this invention are equally applicable to three or more synchronized recording media. Furthermore, this invention is described in the environment of video tape recording apparatus. That is, the recording media are assumed to be video tapes upon which video information is recorded and/or reproduced. The preferred use of this invention is to synchronize the movements or transport of the video tapes such that an editing operation can be performed whereby information which is recorded at a predetermined frame on one tape can be transferred onto another predetermined frame of the other tape. Nevertheless, the teachings of this invention can be used in different environments, such as in the transfer of information between digital tapes, audio tapes, and the like.

In FIG. 1, the video tape recorders are represented as VTR's 1a and 1b, respectively. As is conventional, video information is recorded on the video tape simultaneously with the recording on the same tape of an absolute address signal, such as an SMPTE time code, or the like. For example, the SMPTE time code, hereinafter referred to as an address, identifies the particular frame with which it is associated, generally in the form of the time at which the particular frame is recorded, and a frame number. For example, a particular frame may be digitally identified by 022432xx, wherein 02 represents two hours, 24 represents twenty-four minutes, 32 represents thirty-two seconds and xx represents any one of sixty frames which are recorded in the interval between 2:24:32 and 2:24:33. If the forty-third frame had been recorded, then the address associated therewith is represented as 02243243. The next frame will have the address 02243244, and so on. It is appreciated that frame addresses of this type are recorded on the video tapes included in VTR's 1a and 1b.

The system shown in FIG. 1 includes a main control unit 2, control interface units 3a and 3b and reader interface, or address store units 4a and 4b. Main control unit 2 is adapted to selectively control the speed of the video tapes in VTR's 1a and 1b, to control the operations of the respective VTR's and to detect the instantaneous positions of the tapes transported in these VTR's. For this purpose, main control unit 2 may be formed of discrete logic circuits capable of performing these functions or, in the alternative, the main control unit may comprise a programmed mini-computer well known to those of ordinary skill in the art. The main control unit communicates with control interface units 3a and 3b and with address store units 4a and 4b, via conductive buses whereby command signals are transmitted to the interface and address store units, while information signals are received therefrom.

Main control unit 2 is comprised of a position detector 2a, phase detectors 2b and 2c, a master control circuit 2d and an operation command generator 2e. Position detector 2a is adapted to receive address signals from address store units 4a and 4b, the address signals being representative of the particular frame of the video tapes which then are being scanned by VTR's 1a and 1b, respectively. In actuality, and as will be described, each of the address signals which are supplied to position detector 2a is delayed by one frame interval from the frame pulse which corresponds to that frame and which precedes the address. The position detector senses the absolute positions of the tapes in VTR's 1a and 1b. As shown, position detector 2a is coupled to master control circuit 2d for receiving control or command signals therefrom so as to enable the position detector to sense, or read the address signals supplied thereto.

Phase detectors 2b and 2c are adapted to detect the phase relation of the frame pulses which are reproduced from the video tapes by VTR's 1a and 1b. As is conventional, these frame pulses are recorded at the beginning of each frame interval in the SMPTE time code. The outputs of phase detectors 2b and 2c are coupled to master control circuit 2d, the latter thus being adapted to generate various command signals as a function of the detected phase relation. Operation command generator 2e is adapted to generate various operation commands, such as play, record, forward, rewind, and various speed commands. As examples of the latter, the operation command generator is adapted to generate a normal speed command signal, a higher speed command signal and a slower speed command signal. These command signals are supplied to control interface units 3a and 3b via the indicated buses.

Master control circuit 2d, in addition to being coupled to position detector 2a, is coupled to operation command generator 2e and, via the illustrated buses, to control interface units 3a and 3b and to address store units 4a and 4b. Master control circuit 2d determines the next operation which is to be performed in response to the various signals which are supplied to main control unit 2 as well as the signals which previously had been supplied thereto. As may be appreciated, master control circuit 2d may comprise the programmed portion of a mini-computer, and may include a read only memory and associated processing units. The manner in which master control circuit 2d operates will be described hereinbelow in conjunction with the overall operation of the illustrated system.

Control interface units 3a and 3b are of similar construction. Hence, in the interest of brevity, only one of these units, such as control interface unit 3a, will be described. The control interface unit is connected via a bus to main control unit 2 and via another bus to VTR 1a. The control interface unit includes an input-output buffer (I/O buffer) 5, a play command generator 6, a normal speed control circuit 7, a higher speed control circuit 8 and a lower speed control circuit 9. In addition, control interface unit 3a includes a VTR control buffer and a phase coincidence detector 11. I/O buffer 5 is provided as a conduit for signals between main control unit 2 and the various control circuits included in control interface unit 3a. The various operation and speed command signals from main control unit 2 are supplied to command generator 6 and the respective speed control circuits 7, 8 and 9 via I/O buffer 5. In addition, a signal produced by phase coincident detector 11 is supplied through I/O buffer 5 to the main control unit.

Play command generator 6 is responsive to a play command signal produced by operation command generator 2e and supplied through I/O buffer 5 to initiate a playback operation from the video tape which is transported in VTR 1a. If operation command generator 2a generates a record command signal, a corresponding record control signal is produced by generator 6. Normal speed control circuit 7 is adapted to respond to a normal speed command signal supplied from main control unit 2 to determine, or establish, a normal operational speed for the tape included in VTR 1a. Higher speed control circuit 8 is adapted to respond to a higher speed command signal to establish a tape speed which is higher than the normal speed by several percent, for example by about +10% or so; and lower speed control circuit 9 is adapted to respond to a lower speed command signal to establish a speed lower than the normal speed by several percent, for example, by about −10% or so. The respective signals produced by generator 6 and speed control circuits 7–9 are applied to VTR 1a via VTR control buffer 10.

Phase coincidence detector 11 is adapted to receive a signal from VTR 1a via VTR control buffer 10 when a frame pulse recorded on the video tape is reproduced. In one embodiment, frame pulses reproduced by VTR's 1a and 1b are supplied via the respective buses, main control unit 2 and VTR control buffer 10 to phase coincidence detector 11 such that this detector is capable of detecting a phase coincidence relation of the respective video tapes. The output of phase coincidence detector 11 is supplied via I/O buffer 5 to main control unit 2.

Address store units 4a and 4b are of similar arrangement. Hence, in the interest of brevity, only address store unit 4a is described in detail. This address store unit includes a playback circuit 12, a buffer memory 13, an AND gate 14, a flip-flop circuit 16, a flag generator 17 and an input-output (I/O) buffer 18. Playback circuit 12 is coupled via a bus to VTR 1a and is adapted to receive the frame pulses and frame addresses which are reproduced by the VTR. An output of the playback circuit is coupled to buffer memory 13, the latter being adapted to temporarily store a frame address. In one embodiment, the storage capacity of the buffer memory is equal to a complete frame address and, therefore, when each subsequent address is played back, this subsequent address replaces the previously stored address in the buffer memory. Buffer memory 13 is coupled to I/O buffer 18 and is adapted to respond to a READ command signal generated by main control unit 2 to transfer the address stored therein to I/O buffer 18 and thence, via the illustrated bus, to the main control unit. As shown, I/O buffer 18 has an output connected to buffer memory 13 for supplying the READ command signal thereto.

When buffer memory 13 is energized to transfer the address stored therein to main control unit 2, a START READ signal is generated thereby. At the completion of the read cycle of the buffer memory, which is extremely short, an END READ signal is produced. Buffer memory 13 is coupled to flag generator 17 to supply the START READ signal thereto; and it also is connected to flip-flop circuit 16 to supply the END READ signal thereto. Flag generator 17 may be formed of a bistable multivibrator having set and reset inputs. The START READ signal supplied to the flag generator by buffer memory 13 is adapted to reset the flap generator to produce a binary "0" at its output. The flag generator is adapted to be set in response to a signal supplied to its set input, thereby producing a binary "1" which is hereinafter referred to as a DONE flag.

The END READ signal produced by buffer memory 13 is adapted to set flip-flop circuit 16 to produce a binary "1" at its output. This flip-flop circuit also includes a reset input terminal which is adapted to receive a delayed version of the frame pulse which is reproduced from VTR 1a by playback circuit 12. Accordingly, an output from the playback circuit is supplied through a delay circuit 15, having an extremely short time delay, such as a delay line, a monostable multivibrator, an RC circuit, or the like, to the reset input of flip-flop circuit 16. The output of this flip-flop circuit is coupled to AND gate 14 and is adapted to condition the AND gate to respond to frame pulses supplied to another input thereof by playback circuit 12. The output of this AND gate is coupled to the set output of flag generator 17 for the purpose of setting the DONE flag.

As will become apparent, the presence of the DONE flag produced by flag generator 17 represents that the address stored in buffer memory 13 has been read out therefrom and transferred to I/O buffer 18 to main control unit 2. In the absence of the DONE flag, that is, when flag generator 17 produces a binary "0", a read-out command signal should not be generated. Accordingly, the output of flag generator 17 is coupled via I/O buffer 18 to main control unit 2 so as to apprise the main control unit of the existence of the condition for generating a read-out command signal.

Before describing the overall operation of the system illustrated in FIG. 1, the manner in which a frame pulse and a frame address are read from the video tape and supplied to main control unit 2 will be explained with respect to the timing waveforms shown in FIGS. 2A-2C. As shown in FIG. 2A, the beginning of each frame is indicated by frame pulse $F_{n-1}$, $F_n$, $F_{n+1}$, . . . The frame address, written as an SMPTE time code, is encoded along the tape in the interval between successive frame pulses. Thus, frame address $t=n-1$ is encoded between frame pulses $F_{n-1}$ and $F_n$, frame address $t=n$ is encoded between frame pulses $F_n$ and $F_{n+1}$, and so on.

Let it be assumed that VTR 1a is operated in response to normal speed control circuit 7 so as to advance the video tape at the normal speed. As the video tape is so advanced, the frame pulses and frame addresses recorded therealong are played back by playback circuit 12. It is appreciated that the playback circuit accumulates the entire frame address $t=n-1$ during the frame interval between frame pulses $F_{n-1}$ and $F_n$. At the conclusion of this frame interval, frame address $t=n-1$ is transferred into buffer memory 13. This address transfer operation is performed at a very rapid rate, much faster than the time required to play back the frame address.

At the completion of the frame interval, the next frame pulse $F_n$ is played back and is supplied from playback circuit 12 to AND gate 14. As will be described, flip-flop circuit 16 had been set so as to condition the AND gate to transmit frame pulse $F_n$ to the set input of flag generator 17. Hence, the DONE flag is set, and this DONE flag is supplied through I/O buffer 18 to main control unit 2. Let it be further assumed that an address read-out operation is to be performed. Accordingly, master control unit 2d senses the presence of the DONE flag to supply a read-out command signal from main control unit 2 through I/O buffer 18 to buffer memory 13. This read-out command signal occurs at some time during the frame interval following frame pulse $F_n$, as represented by read-out command signal $T_1$ (FIG. 2B). Buffer memory 13 responds to this read-out command signal to transfer the frame address $t=n-1$ to main control unit 2 via I/O buffer 18. At the commencement of this address transfer operation, the buffer memory supplies the START READ signal to flag generator 17, thereby resetting the DONE flag. In the absence of the DONE flag, master control unit 2d is unable to generate another read command signal. Hence, there is no problem of reading out the same address more than once from buffer memory 13. The resetting of the DONE flag is represented by the negative transition in the waveform shown in FIG. 2C.

At the completion of the address transfer operation, buffer memory 13 generates the END READ signal which serves to set flip-flop circuit 16 and thus condition AND gate 14 to respond to the next frame pulse $F_{n+1}$ played back by playback circuit 12. Upon the occurrence of frame pulse $F_{n+1}$, AND gate circuit 14 is enabled so as to set flag generator 17 once again. Hence, the DONE flag is supplied through I/O buffer 18 to main control unit 2. At a very short delayed time following the occurrence of frame pulse $F_{n+1}$, the delayed version of this frame pulse is supplied from delay circuit 15 to reset flip-flop circuit 16.

When the frame interval following frame pulse $F_n$ is completed, the frame address $t=n$ which had been played back by playback circuit 12 is transferred into buffer memory 13. This has no effect upon the address which is subsequently transferred to main control unit 2 because the previously stored address $t=n-1$ already had been transferred. Thus, upon the occurrence of the next frame pulse $F_{n+1}$, the preceding frame address $t=n$ will have been loaded into buffer memory 13. Frame pulse $F_{n+1}$ is supplied through AND gate 14, which had been conditioned by the set flip-flop circuit 16, to set the DONE flag. If another address transfer operation is to be performed (as will be described below, main control unit 2 is adapted to command at least two successive address transfer operations for each address transfer cycle), then master control unit 2d senses the presence of the DONE flag to supply the read command signal $T_2$ (FIG. 2B) to buffer memory 13. Thus, the frame address, or time code $t=n$, then stored in the buffer memory, is transferred to main control unit 2. At the commencement of this address transfer operation, buffer memory 13 supplies the START READ signal to reset the DONE flag, as represented by the narrow DONE flag shown in FIG. 2C.

At the completion of the address transfer operation, buffer memory 13 supplies the END READ signal to set flip-flop circuit 16. This flip-flop circuit had been reset in response to the delayed frame pulse $F_{n+1}$. Accordingly, AND gate 14 is conditioned by the set flip-flop circuit to transmit the next frame pulse $F_{n+2}$ to flag generator 17. At the completion of the frame interval commencing with frame pulse $F_{n+1}$, the frame address, or time code $t=n+1$, which had been played back by playback circuit 12 is transferred into buffer memory 13. Then, upon the occurrence or frame pulse $F_{n+2}$, AND gate 14 sets the DONE flag, as shown in FIG. 2C. If another address transfer operation is not to be performed, then a read command signal will not be supplied to buffer memory 13. Thus, the buffer memory will not supply the START READ signal to flag generator 17. This means that the DONE flag remains set, as shown in FIG. 2C. Nevertheless, at the conclusion of each succeeding frame interval, the frame address, or time code, which had been played back by playback circuit 12 is transferred into buffer memory 13. It is appreciated that the temporary storage of these frame addresses continues regardless of whether the contents of the buffer memory are transferred to main control unit 2.

Address store unit 4b functions in substantially the same manner as address store unit 4a. However, the read command signal supplied to buffer memory 13 in address store unit 4b by master control circuit 2d is delayed by a time interval $T_0$ from the read out command $T_2$ (FIG. 2B) which is supplied to address store unit 4a. This time delay is shown in FIG. 2E. That is, the read command signal is not supplied to address store unit 4b until a delayed time $T_0$ following the second address transfer operation from address store unit 4a to main control unit 2. The reason for this time delay relates to the capstan servo lock range and phase coincidence range between the tapes transported in VTR's 1a and 1b, and will be described in greater detail below. In response to this delayed read-out command signal, (i.e., delayed by $T_0$ from read out command $T_2$), frame address, or time code $t=m$ which is stored in the buffer memory then is read out therefrom and transferred through I/O buffer 18 of address store unit 4b to main control unit 2. At the end of the buffer memory read-out cycle, the buffer memory supplies the END READ signal to flip-flop circuit 16, thereby setting this flip-flop circuit so as to condition AND gate 14 to transmit the next frame pulse to flag generator 17. Hence, at the completion of the frame interval (identified by the frame address, or time code $t=m+1$), the next frame pulse sets flag generator 17 so as to set the DONE flag, as shown in FIG. 2F. This conditions address store unit 4b to undergo another address transfer operation.

With respect to the address transfer operation carried out in address store unit 4a, the first read-out command signal $T_1$ is seen to prepare the address store unit for a second read-out operation which should be performed in synchronism with frame pulses $F_{n-1}, F_n, \ldots$.

Although the respective read-out command signals illustrated in FIGS. 2B and 2E are shown with a finite duration, it should be appreciated that these read-out command signals are extremely narrow pulses. Furthermore, the DONE flags produced by flag generators 17 in address store units 4a and 4b are adapted to be set in coincidence with the falling edge of the respective frame pulses, and are adapted to be reset in coincidence with the extremely narrow read-out command signals.

As mentioned above, an address transfer operation is not initiated unless the DONE flag is set. Accordingly, in order to determine the condition of the DONE flag, master control circuit 2b periodically checks the DONE flag condition. As an example, a repetitive check or test signal may be generated at a rate of about 6 KHz, or about 100 times for each frame. When this periodic checking senses the presence of the DONE flag, then an address transfer operation can be carried out and the read-out command signal is enabled.

The frame addresses, or time codes, which are read out from VTR's 1a and 1b and transferred to main control unit 2 by address storage units 4a and 4b are supplied to position detector 2a. The position detector is adapted to sense when the actual position of the video tape processed in VTR 1a is the same distance from its end, or predetermined location as is the actual position of the tape processed in VTR 1b. Let it be assumed that the desired end or predetermined position of the video tape in VTR 1a is identified by frame address $T_{AO}$ and that the end or predetermined position of the tape in VTR 1b is identified by frame address $T_{BO}$. That is, when the respective tapes reach these predetermined locations, the tapes should be driven in synchronism with each other and, more particularly, under the control of a capstan servo loop or circuit. Once this synchronized, servo-controlled condition is achieved, a proper editing operation can be carried out whereby information from one VTR can be transferred to the other. Let it be further assumed that the instantaneous position of the tape in VTR 1a is identified by frame address $T_A$ and that the instantaneous position of the tape in VTR 1b is identified by frame address $T_B$. It is appreciated that addresses $T_A$ and $T_B$ vary as the video tapes are advanced, but that addresses $T_{AO}$ and $T_{BO}$ remain fixed. Now, the two tapes will be in a synchronized relation when $$T_{AO}-T_A=T_{BO}-T_B.$$

That is, when this condition is attained, both tapes will be equidistant from their end, or predetermined positions.

The foregoing equation can be rewritten as:

$$T_A-T_B=T_{AO}-T_{BO}.$$

It is appreciated that the expression on the right side of the equation is a fixed constant. Frame addresses $T_A$ and $T_B$ are supplied to position detector 2a by address store units 4a and 4b, respectively. The position detector functions to subtract these frame addresses and to compare the resultant difference therebetween to the fixed constant $T_{AO}-T_{BO}$.

If the address differential $T_A-T_B$ is greater than the fixed address differential $T_{AO}-T_{BO}$ ($T_A-T_B>T_{AO}-T_{BO}$), then the video tape in VTR 1a is closer to its end or predetermined position than is the tape in VTR 1b. This condition is determined by position detector 2a and supplied to master control circuit 2d for the purpose of generating a higher speed command signal, whereby the tape in VTR 1b is driven at a higher than normal speed. On the other hand, if the address differential $T_A-T_B$ is less than the fixed address differential $T_{AO}-T_{BO}$ ($T_A-T_B<T_{AO}-T_{BO}$), then the tape in VTR 1b is closer to its end or predetermined position than is the tape in VTR 1a. This condition is sensed by position detector 2a, and master control circuit 2d responds to this sensed condition to supply a lower speed command signal to control interface unit 3b, thereby driving the tape in VTR 1b at a lower than normal speed. If the address differential $T_A-T_B$ is equal to the fixed address differential $T_{AO}-T_{BO}$ ($T_A-T_B=T_{AO}-T_{BO}$), then both tapes are equidistant from their respective end or predetermined positions. This condition is sensed by position detector 2a, and master control circuit 2d responds thereto to generate a normal speed command signal so as to drive the tape in VTR 1b at the normal speed. If this last-mentioned condition remains for a predetermined period of time, or for a predetermined number of successive frame addresses, then the respective tapes in VTR's 1a and 1b are in synchronism with each other and a conventional capstan servo loop, or servo circuit, is completed so as to drive the tape in VTR 1b in proper servo-controlled synchronism. The reason for delaying the completion of the servo loop for servo-controlling the movement of tape in VTR 1b is that since the tape in VTR 1b can be driven at higher and lower speeds, it is possible for this tape momentarily to be equidistant from its end or predetermined position with the tape in VTR 1a. To avoid the premature completion of the servo loop in response to this momentary condition, the address differential $T_A-T_B$ is checked a predetermined number of times to insure accurate synchronism between the tapes.

Although the respective frame addresses, or time codes, which are stored in buffer memories 13 of address store units 4a and 4b are updated at each frame interval, all of these addresses are not necessarily transferred to main control unit 2. Rather, the read-out command signals are produced by the main control unit only when a predetermined phase coincidence relation in the frame pulses exists between the tapes processed in VTR's 1a and 1b. More particularly, and as a numerical example, when the frame pulse which is reproduced from VTR 1a and the frame pulse which is reproduced by VTR 1b are within about 0.2 times the frame interval of each other, then the respective tapes are in sufficiently close phase coincidence so as to generate the respective read-out command signals. Phase detectors 2b and 2c detect the respective frame pulses which are reproduced from the video tapes, and master control circuit 2d responds to these detected frame pulses to sense the phase coincident relation. As an alternative, phase coincidence detectors 11 in control interface units 3a and 3b can be supplied with sufficient signals so as to detect the aforementioned phase coincidence relation between the tapes processed in VTR's 1a and 1b.

The overall operation of the system shown in FIG. 1 now will be described with reference to the flow chart illustrated in FIG. 3. Initially, the video tapes in both VTR's 1a and 1b are rewound from their respective, desired end, or predetermined positions $T_{AO}$ and $T_{BO}$. Then, VTR 1a is operated to advance the video tape therein in capstan servo-locked condition. At the same time, or at a time slightly delayed therefrom, VTR 1b is operated to advance the tape therein at a higher speed, for example, under the control of higher speed control circuit 8. Depending upon the setting and paramters of this higher speed control circuit, the video tape in VTR 1b will be driven at from several percent to several ten percent higher than the normal speed.

As the respective video tapes are advanced, the frame pulses recorded thereon are reproduced and buffer memories 13 store updated frame addresses. Master control circuit 2d tests whether the aforementioned phase coincidence relation exists between the video tapes. If this phase coincidence relation is not present, the phase coincidence test is repeated. However, if phase coincidence is detected, then main control unit 2 supplies the read-out command signal to address store unit 4a. This read-out command signal is shown as signal $T_1$ in FIG. 2B. Accordingly, the address then stored in buffer memory 13 is transferred from address store unit 4a to the main control unit. This is the first time that the frame address, or time code, is read from address store unit 4a. In response to this same read-out command signal, the next frame addres stored in buffer memory 13 is transferred from address store unit 4a to main control unit 2, shown as the next read-out signal $T_2$ (FIG. 2B). Hence, in response to read-out signal $T_2$, frame address $T_A$ is transferred to position detector 2a.

As shown in the flow chart of FIG. 3, at the delayed time $T_o$ following read-out signal $T_2$, the frame address stored in buffer memory 13 of address store unit 4b is transferred to position detector 2a. Hence, the position detector now is supplied with frame addresses, or time codes, $T_A$ and $T_B$. The address differential $T_A - T_B$ then is obtained, and this address differential is compared to the fixed address differential $T_{AO} - T_{BO}$. If $T_A - T_B > T_{AO} - T_{BO}$, VTR 1b is operated to advance the video tape therein at the higher than normal speed. Main control unit 2 then returns to the phase coincidence test to resume the operations described above. On the other hand, if $T_A - T_B < T_{AO} - T_{BO}$, then VTR 1b is operated to advance the video tape therein at the lower than normal speed. Main control unit 2 then returns to the aforementioned phase coincidence test to resume the sequence of operations described above.

If $T_A - T_B = T_{AO} - T_{BO}$, main control unit 2 produces a normal speed command signal, whereby VTR 1b is controlled to advance the video tape therein at the normal speed, but without a capstan servo-locked condition. The next addresses stored in buffer memories 13 in address store units 4a and 4b then are transferred to position detector 2a for another comparison with fixed address differential $T_{AO} - T_{BO}$. Depending upon this second comparison, VTR 1b is controlled to advance the tape therein either at the higher speed, the lower speed or the normal speed. Finally, if $T_A - T_B = T_{AO} - T_{BO}$ a predetermined number of times, then main control unit completes the capstan servo loop of VTR 1b such that further movement of the video tape is servo-controlled. When the end or predetermined positions $T_{AO}$ and $T_{BO}$ of the respective video tapes are reached, operation command generator 2e generates suitable playback and record command signals so as to effect an editing operation. Information then can be transferred from one video tape to the other.

FIGS. 4A-4K represent timing waveforms corresponding to the operation represented by the flow chart shown in FIG. 3. Let it be assumed that the frame pulses which are reproduced from VTR 1a are as represented by FIG. 4A, and that the frame pulses reproduced by VTR 1b are as represented by FIG. 4B, with a particular frame address (for simplification, not shown as the SMPTE time code) preceded by its corresponding frame pulse. Initially, VTR 1b is driven at a higher than normal speed. Because of the speed differential of the VTR's, the relative phase therebetween changes at every frame. Nevertheless, there is a time wherein the aforementioned phase coincidence relation is established. This phase coincidence relation exists over a duration which is represented by the phase coincidence pulses PH shown in FIG. 4C. When phase coincidence is detected, a read-command signal, as shown in FIG. 4D, is supplied from main control unit 2 to address store unit 4a. If the DONE flag is set, the presence of the read-command signal and the DONE flag will initiate a read-out operation from buffer memory 13. START READ pulse $T_1$ is shown in FIG. 4E, and this START READ pulse occurs at some location during the frame interval as determined by the read-command signal.

The START READ pulse $T_1$ resets the DONE flag, as shown in FIG. 4J. At the conclusion of the buffer memory read cycle, the END READ pulse is produced, as shown in FIG. 4F. This END READ PULSE sets flip-flop circuit 16, the latter having previously been reset in response to the delayed frame pulse shown in FIG. 4G. When flip-flop circuit 16 is set, as shown in FIG. 4H, the next-occurring frame pulse (e.g., frame pulse #45) is transmitted through AND gate 14 to set the DONE flag, as shown in FIGS. 4I and 4J. Once the DONE flag is set, another buffer memory read-out operation can be performed. Hence, the next START READ pulse $T_2$ is produced in synchronism with the frame pulse (e.g., frame pulse #45) so as to read out address $T_A$ (address #46) from buffer memory 13 in address store unit 4a. Of course, the START READ pulse resets the DONE flag (FIG. 4J); and at the completion of the readout cycle, the END READ pulse (FIG. 4F) sets flip-flop circuit 16 so as to condition AND gate 14 to transmit the next frame pulse (e.g., frame pulse #44) to flag generator 17. Upon the occurrence of the next frame pulse (#44), the DONE flag once again is set.

The waveform of FIG. 4K represents that buffer memory 13 of address store unit 4b is read out at the delayed time $T_o$ following the second START READ pulse $T_2$, whereby frame address #63 is read out therefrom. If the time delay $T_o$ is selected to be about one-half the frame interval, or less, then even though the phase of the frame pulse which is reproduced by VTR 1a may be shifted somewhat from the frame pulse which is reproduced by VTR 1b, the corresponding frame addresses are read out from the buffer memory. Hence, this difference in phase does not introduce an error into the address transfer operation.

It is assumed that $T_A - T_B < T_{AO} - T_{BO}$. ($T_A = 46$; $T_A = 46$; $T_B = 63$; $T_{AO}$ is assumed to be 5 and $T_{BO}$ is assumed to be 24). Accordingly, VTR 1b is controlled to advance the video tape therein at the lower speed in response to this address comparison. This is represented by the larger period or spacing between successive frame pulses shown in FIG. 4B. Ultimately, the frame pulses shown in FIG. 4B will exhibit a phase coincidence relation with respect to the frame pulses shown in FIG. 4A. This phase coincidence relation is represented by the phase coincidence pulse PH shown in FIG. 4C. Accordingly, the aforementioned operation is repeated, whereby the addresses stored in buffer memory 13 are read out therefrom twice in succession and supplied to main control unit 2 from address store unit 4a. The second address is repeated as address #33. At the delayed time $T_o$ following the second address read-out operation, the address (#51) stored in buffer memory 13 of address store unit 4b is transferred to main control unit 2. At that time, the comparison operation is performed upon the address differential $T_A - T_B$. It is here assumed that $T_A - T_B < T_{AO} - T_{BO}$ again. Hence, main control unit 2 continues to control VTR 1b to advance the video tape therein at the lower speed.

As shown in FIG. 4B, the speed of the video tape in VTR 1b remains at the lower speed until $T_A - T_B = T_{AO} - T_{BO}$, that is, until address #21 is transferred from store unit 4a and address #40 is transferred from store unit 4b. At that time, VTR 1b is controlled to advance the tape therein at the normal speed (0%). At this speed, if a predetermined number of address comparisons are achieved, then the video tape in VTR 1b is servo-controlled so as to be advanced in the capstan servo lock mode. More particularly, and as shown, address #18 from the tape processed in VTR 1a is compared to address #37 from the tape processed in VTR 1b with the difference therebetween being equal to 19 ($T_{AO} - T_{BO}$). At the next read command signals, address #16 is compared to address #35 with the difference therebetween still equal to 19. The next read command signals results in a comparison of address #14 to address #33 with the difference therebetween again equal to 19. Since three successive correct address comparisons are achieved, the tape in VTR 1b then is transported in the capstan servo lock mode with accurate phase coincidence in the frame pulses from the respective tapes. When the predetermined frames ($T_{AO} = 5$; $T_{BO} = 24$) are reached, the edit operation is performed.

Figure 5A:
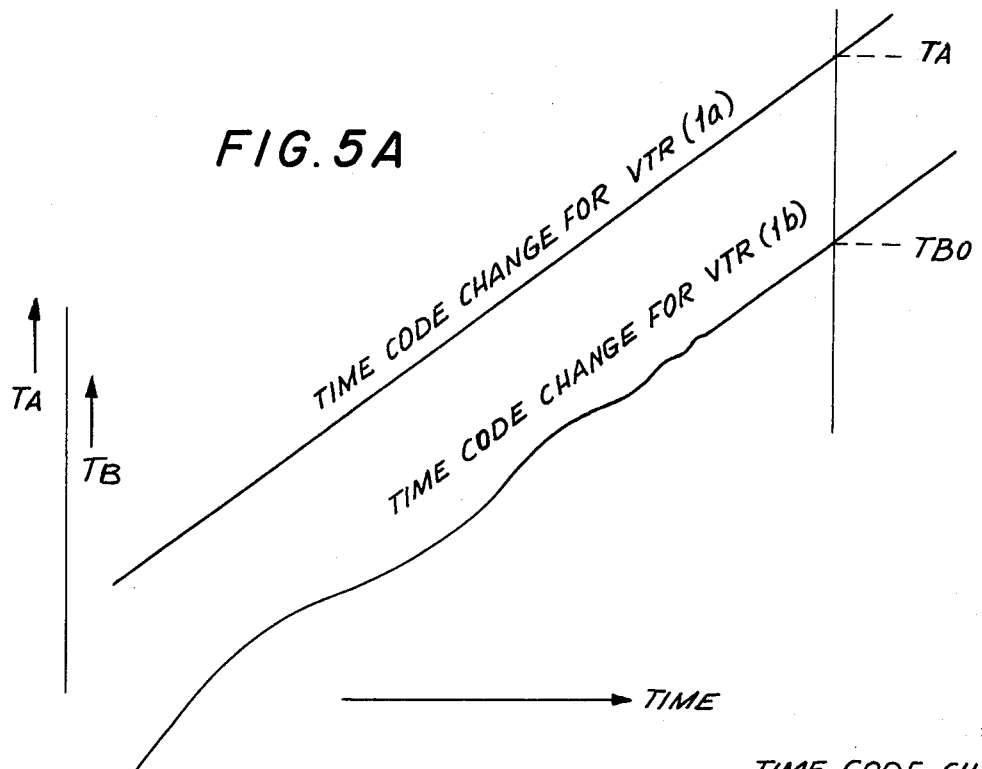
FIGS. 5A–5F are graphical depictions and waveforms representing the manner in which synchronized speed of two record media are attained in accordance with this invention.
Figure 5B:
Figure 5C:
Figure 5D:

FIGS. 5A–5F represent the manner in which the speed of the video tape in VTR 1b is controlled in accordance with the aforedescribed operation. In FIG. 5A, the ordinate represents the respective frame addresses, or time codes $T_A$ and $T_B$, while the abscissa represents time. The tape in VTR 1a is driven at the fixed capstan servo-controlled speed. Initially, the tape in VTR 1b is driven at the relatively higher speed. This is represented by the higher speed command signal shown in FIG. 5C. While the tape in VTR 1b is driven at the higher speed, a time will occur when $T_A - T_B = T_{AO} - T_{BO}$. At the time, the higher speed command signal is terminated and the normal speed command signal is produced, as shown in FIG. 5B. However, at the next address comparison operation, $T_A - T_B < T_{AO} - T_{BO}$. This terminates the normal speed command signal and initiates the lower speed command signal shown in FIG. 5D. The curve representing VTR 1b in FIG. 5A is seen to have its speed reduced. This also is shown by the tape speed curve for VTR 1b in FIG. 5F.

Figure 5E:
Figure 5F:
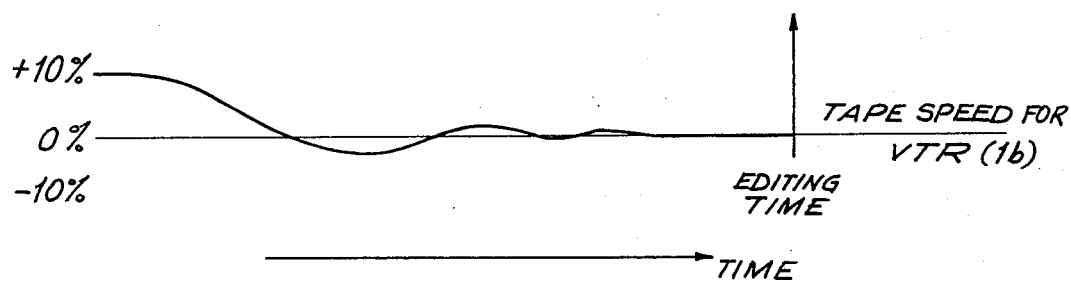

While driven at the lower speed, it will be sensed that $T_A - T_B > T_{AO} - T_{BO}$. This terminates the lower speed command signal and initiates the higher speed command signal so as to increase the tape speed of VTR 1b. As is seen from FIG. 5F, the actual speed of tape in VTR 1b fluctuates, or hunts, about its normal tape speed. Soon, $T_A - T_B = T_{AO} - T_{BO}$ for a predetermined number of address comparisons. At that time, VTR's 1a and 1b are in synchronism, and the video tape in VTR 1b then is servo-controlled so as to be driven in the capstan servo lock condition, as represented by FIG. 5E. This occurs well in advance of the end or predetermined positions $T_{AO}$ and $T_{BO}$. When these end positions are reached, an editing operation can be performed accurately to effect information transfer between the video tapes.

The reason for delaying by a time $T_o$ the address transfer from address store unit 4b following the address transfer from address store unit 4a now will be explained. Let it be assumed that the capstan servo lock range is 0.2 frame interval. This means that if the frame pulses from the tape processed by VTR 1b are within 0.2 frame interval of the frame pulses from the tape processed by VTR 1a, then VTR 1b can be pulled into the capstan servo lock mode, and the frame pulses from the respective tapes can be locked in phase coincidence. Accordingly, the address comparison operation is performed only when the frame pulses from the tape in VTR 1b are within 0.2 frame interval of the frame pulses from the tape in VTR 1a. If the address comparison is carried out when the tapes are further out of frame synchronism, i.e., greater than 0.2 frame interval, the capstan servo capture range of VTR 1b may be exceeded, resulting in a possible dislocation of one frame when capstan servo lock is achieved.

Referring again to FIGS. 4A and 4B, address #46 ($T_A$) is compared to address #63 ($T_B$) during phase coincidence pulse PH. The difference between these addresses is 17. For all additional address comparisons during phase coincidence pulse PH, the difference also should be 17. Let it be assumed that address #41 is transferred from address store unit 4a. This address transfer operation occurs slightly after the occurrence of the frame pulse following address #41. At the time of occurrence of that frame pulse, address #59 is stored in buffer memory 13 of address store unit 4b because all of address #58 has not yet been read from the tape. Consequently, if an address transfer is carried out from address store unit 4b simultaneously with an address transfer from unit 4a, address #59 will be compared to address #41, with the resultant difference of 18. To avoid this erroneous comparison, the address transfer from unit 4b is delayed by $T_o$ (0.2 frame interval) following the address transfer from unit 4a. Consequently, address #58, which now is stored in buffer memory 13 of unit 4b, is compared to address #41. It may be appreciated that $T_o$ can be within the range of 0.2 to 0.8 frame interval.

While the present invention has been particularly shown and described with respect to a preferred embodiment, it should be readily apparent to those of ordinary skill in the art that various changes and modifications in form and details can be made without departing from the spirit and scope of the invention. For example, the address comparison has been described as comparing the address differential $T_A - T_B$ to the fixed address differential $T_{AO} - T_{BO}$. As an alternative, the address differential $T_A - T_{AO}$ can be compared to the address differential $T_B - T_{BO}$. When these differentials are equal, then VTR 1b should be controlled so as to advance the video tape therein at the normal speed. Further, when these address differentials are equal for a predetermined number of successive addresses, then VTR 1b can be driven in the capstan servo-lock mode.

As another modification, the arrangement shown in FIG. 1 can be formed as discrete logic circuits or, preferably, may comprise a microprocessor or other suitably programmed mini-computer. One of ordinary skill in the art would be readily enabled to program such a microprocessor or mini-computer.

Therefore, it is intended that the appended claims be interpreted as including the foregoing as well as various other changes and modifications.

What is claimed is:

1. A system for synchronizing the movement of a first recording medium by first transport means with the movement of a second recording medium by second transport means, each of said first and second recording media having addressable recording frames identified by frame signals and addresses recorded thereon, said system comprising:

first advancing means for controlling said first transport means to move said first recording medium at a fixed normal speed in capstan servo-controlled relation;

second advancing means for controlling said second transport means to move said second recording medium at a selective speed greater than, equal to or less than said normal speed;

first playback means for playing back the addresses recorded on said first recording medium while said first recording medium is moved at said fixed normal speed in said capstan servo-controlled relation;

second playback means for playing back the addresses recorded on said second recording medium while said second recording medium is moved at said selective speed;

address comparison means selectively operable upon the occurrence of a predetermined phasing condition of said first and second recording media for comparing the respective instantaneous addresses played back by said first and second playback means to respective predetermined first and second addresses; and speed command means responsive to said address comparison means for commanding said second advancing means to control said second transport means to move said second recording medium at said greater than normal speed when the difference between said instantaneous address played back by said second playback means and said second predetermined address is greater than the difference between said instantaneous address played back by said first playback means and said first predetermined address, to control said second transport means to move said second recording medium at said less than normal speed when the difference between said instantaneous address played back by said second playback means and said second predetermined address is less than the difference between said instantaneous address played back by said first playback means and said first predetermined address, and to control said second transport means to move said second recording medium at said normal speed when the difference between said instantaneous address played back by said second playback means and said second predetermined address is equal to the difference between said instantaneous address played back by said first playback means and said first predetermined address.

2. The system of claim 1 wherein the instantaneous address played back by said first playback means is represented as $T_A$, the instantaneous address played back by said second playback means is represented as $T_B$, the first predetermined address is represented as $T_{AO}$, and the second predetermined address is represented as $T_{BO}$; and wherein said address comparison means compares the difference $T_A - T_B$ to the fixed difference $T_{AO} - T_{BO}$, such that said second recording medium is moved at said higher than normal speed when $T_A - T_B > T_{AO} - T_{BO}$, said second recording medium is moved at said less than normal speed when $T_A - T_B < T_{AO} - T_{BO}$, and said second recording medium is moved at said normal speed when $T_A - T_B = T_{AO} - T_{BO}$.

3. The system of claim 1 wherein said second advancing means comprises high speed control means responsive to a high speed command signal from said speed command means, low speed control means responsive to a low speed command signal from said speed command means, and normal speed control means responsive to a normal speed command signal from said speed command means.

4. The system of claim 1 wherein said second advancing means further comprises capstan servo means for controlling said second transport means to move said second recording medium at a fixed capstan servo controlled speed; and said speed command means comprises means for checking if said difference between said instantaneous address played back by said second playback means and said second predetermined address is equal to said difference between said instantaneous address played back by said first playback means and said first predetermined address a predetermined number of successive times in order to command said second advancing means to control said second transport means to move said second recording medium at said fixed capstan servo controlled speed.

5. The system of claim 1 further including phase coincidence means for detecting a phase coincidence condition of a frame signal recorded on said first recording medium with a frame signal recorded on said second recording medium to operate said address comparison means.

6. The system of claim 5 wherein said address comparison means includes first and second address store units, each comprising temporary memory means into which the address played back by a respective playback means is written and out of which the stored address is read in response to a read-out signal, and bistate means set to a first state following the completion of an address read-out operation and reset to a second state at the start of a read-out operation; and further including a main control unit for generating read-out signals when said phase coincidence condition is detected and said bistate means in at least one of said address store units is in its first state.

7. The system of claim 6 wherein said bistate means comprises a DONE flag generator for generating a DONE flag signal when in its first state; and wherein each of said address store units further includes a flip-flop circuit connected to be set at the completion of said address read-out operation and to be reset at a delayed time subsequent to the occurrence of a frame signal, and a gate conditioned when said flip-flop circuit is set to set said DONE flag generator to generate said DONE flag signal at said occurrence of said frame signal.

8. The system of claim 7 wherein at least two successive addresses are read out of said temporary memory means in response to the detection of a phase coincidence condition.

9. The system of claim 8 wherein said main control unit supplies a read-out signal to said first address store unit if a phase coincidence condition is detected and a DONE flag signal has been generated, and said main control unit supplies a read-out signal to said second address store unit at a predetermined delayed time following the supply of said read-out signal to said first address store unit.

10. The system of claim 9 wherein said main control unit supplies two successive read-out signals to said first address store unit, the second read-put signal being synchronized with a frame pulse, and wherein the read-out signal supplied to said second address store unit is delayed with respect to said second read-out signal.

11. A method of bringing a second recording tape into synchronism with a first recording tape such that both of said recording tapes are advanced by servo-controlled means to predetermined locations therealong, each of said recording tapes having addressable frames identified by frame signals and addresses recorded thereon, said method comprising the steps of:

rewinding said first and second recording tapes from respective predetermined addressable frame identified as $T_{AO}$ and $T_{BO}$, respectively;

advancing said first recording tape from its rewound position toward addressable frame $T_{AO}$ at a fixed speed in capstan servo-controlled relation;

advancing said second recording tape from its rewound position toward addressable frame $T_{BO}$ at a selective speed greater than, equal to or less than said fixed speed;

playing back the addresses $T_A$ and $T_B$ of said first and second recording tapes, respectively, as said recording tapes are advanced toward said addressable frames $T_{AO}$ and $T_{BO}$, respectively;

selectively comparing the address differential $T_A - T_B$ with the fixed address differential $T_{AO} - T_{BO}$ to advance said second recording tape at a greater than fixed speed if $T_A - T_B > T_{AO} - T_{BO}$, to advance said second recording tape at a less than fixed speed if $T_A - T_B < T_{AO} - T_{BO}$, and to advance said second recording tape at said fixed speed if $T_A - T_B = T_{AO} - T_{BO}$; and servo-controlling said second recording tape to be advanced in synchronism with said first recording tape at said fixed speed if the address differential $T_A - T_B$ remains equal to the fixed address differential $T_{AO} - T_{BO}$ for a predetermined number of successive address playback operations.

12. A method of bringing a second recording tape into synchronism with a first recording tape such that both of said recording tapes are advanced by servo-controlled means to predetermined locations therealong, each of said recording tapes having addressable frames identified by frame signals and addresses recorded thereon, said method comprising the steps of:

rewinding said first and second recording tapes from respective predetermined addressable frames identified as $T_{AO}$ and $T_{BO}$, respectively;

advancing said first recording tape from its rewound position toward addressable frame $T_{AO}$ at a fixed speed in capstan servo-controlled relation;

advancing said second recording tape from its rewound position toward addressable frame $T_{BO}$ at a selective speed greater than, equal to or less than said fixed speed;

playing back the frame signals from said first and second recording tapes;

playing back the addresses $T_A$ and $T_B$ of said first and second recording tapes, respectively, as said recording tapes are advanced toward said addressable frames $T_{AO}$ and $T_{BO}$, respectively;

selectively comparing the address differential $T_A - T_B$ with the fixed address differential $T_{AO} - T_{BO}$ to advance said second recording tape at greater than said fixed speed if $T_A - T_B > T_{AO} - T_{BO}$, to advance said second recording tape at less than said fixed speed if $T_A - T_B < T_{AO} - T_{BO}$, and to advance said second recording tape at said fixed speed if $T_A - T_B = T_{AO} - T_{BO}$, wherein said step of selectively comparing comprises detecting when the played back frame signals are within a predetermined phase relation to each other, and comparing said address differential only when said played back frame signals are within said predetermined phase relation; and servo-controlling said second recording tape to be advanced in synchronism with said first recording tape at said fixed speed if the address differential $T_A - T_B$ remains equal to the fixed address differential $T_{AO} - T_{BO}$ for a predetermined number of successive played back addresses.

13. The method of claim 12 wherein said step of selectively comparing further comprises temporarily storing each address $T_A$ of said first recording tape and temporarily storing each address $T_B$ of said second recording tape; reading out said stored address $T_A$ in synchronism with the playing back of a frame signal from said first recording tape provided that the frame signals played back from said first and second recording tapes are within said predetermined relation; and reading out said stored address $T_B$ at a time delayed by a predetermined interval from the reading out of said stored address $T_A$.

14. The method of claim 13 wherein successive frame signals on each of said recording tapes are separated by a frame interval, and wherein said stored address $T_B$ is read out at a time delayed by a predetermined fraction of a frame interval from the reading out of said stored address $T_A$.

15. The method of claim 14 wherein the step of reading out a stored address comprises setting a flag generator upon the playing back of a frame signal, producing a read-out signal only if said flag generator is set and the frame signals played back from said first and second recording tapes are within said predetermined relation so as to read out the temporarily stored address, and preparing said flag generator to be set in response to the playing back of the next frame signal upon the completion of reading out the temporarily stored address.

* * * * *